United States Patent [19]

Bouton et al.

[11] 4,162,064

[45] Jul. 24, 1979

[54] LINEAR SPRING AND END THRUST MEMBER

[75] Inventors: Daniel A. Bouton, Vigneux; Jean E. Martoglio, Guignes Rabutin; Jean-Pierre Maulat, Saint Maur, all of France

[73] Assignee: Societe Nationale d'Etude et de Construction de Moteurs d'Aviation, Paris, France

[21] Appl. No.: 875,971

[22] Filed: Feb. 8, 1978

[30] Foreign Application Priority Data

Feb. 8, 1977 [FR] France .................. 77 04143

[51] Int. Cl.² ............................................. F16F 1/12
[52] U.S. Cl. .................................... 267/177; 267/170; 267/179
[58] Field of Search ............... 267/167, 170, 178, 179, 267/177, 20 R, 60 R; 64/15 C

[56] References Cited

U.S. PATENT DOCUMENTS

| 2,514,394 | 7/1950 | Irving ................................. 64/15 C |
| 2,661,206 | 12/1953 | Gregorie ................................ 267/60 |
| 3,110,464 | 11/1963 | Baratoff et al. ................. 267/178 X |
| 3,494,613 | 2/1970 | Hatfield ............................ 267/178 X |

*Primary Examiner*—George E. A. Halvosa
*Attorney, Agent, or Firm*—Bacon & Thomas

[57] ABSTRACT

A device permitting converting a rectilinear motion into a linear force and vice-versa consists of a helical spring having a retainer to hold the last two loops at each end relatively stationary. The immobilization is achieved either by wedges inserted between the last two loops at each end or by cups shaped so as to receive the ends of the spring. The invention is applicable in regulatory systems.

3 Claims, 3 Drawing Figures

LINEAR SPRING AND END THRUST MEMBER

BACKGROUND OF THE INVENTION

The invention pertains to devices which allow converting a displacement into a force and vice-versa.

In known devices, such a conversion is provided by a spring, generally a helical spring whose pitch gradually decreases toward the ends, which are ground to provide flat support surfaces.

This type of spring does not yield a linear conversion of a displacement into a force. In fact, considering the expression for the rigidity of a helical spring: $R_c = Gd^4/8D^3n$, where G is the shear modulus, d is the wire diameter, D is the average diameter of the spring and n is the number of loops, it is seen that, for this type of spring whose pitch decreases gradually toward the ends and whose number of loops varies directly with the compression, the rigidity varies and leads to an error in the conversion of the motion into a force. Examples of prior spring devices known to applicants are shown in the following patents: French Pat. Nos. 995,091 and 1,288,773; U.S. Pat. Nos. 2,695,169 and 3,951,391; British Pat. No. 260,707 of 1926, 192,578 of 1923 and 1,237,071 of 1971; Swiss Pat. No. 236,279; and German Pat. No. 1,282,361. The above patents show grooved end caps for helical springs, flat ends or other means engaging certain end loops but none of them solves the problem recognized by the present applicants, as fully described hereafter.

SUMMARY OF THE INVENTION

The present invention seeks to eliminate the above error, which is very significant in certain applications, by providing a number of fixed loops and thus yielding a constant rigidity and near linearity of conversion with a minimum of hysteresis.

It pertains to a device for linearly converting a rectilinear displacement into a force and vice-versa, consisting of a helical spring containing at each of its ends a means of immobilizing final loops, consisting of a helical groove machined on a cup which constitutes the support surface of the spring.

Such a device according to the invention is characterized by the fact that a helical slope, generated by a straight line perpendicular to the axis of the helix, extends the groove, that a portion of the wall of the groove is generated by the same line as the slope, that a notch transverse to the slope is provided in said slope at the point it joins the groove, and that the loops which fit within the helical groove are glued while the loop section which merely rests on the helical slope is not.

In a preferred arrangement of the invention, the helical slope extends over a sector of approximately 120° and the end of each slope determines the beginning of the useful or effective loops. The pitch of the groove and of the helical slope will advantageously be chosen larger than the pitch of the free spring. The number of useful loops remains constant regardless of the compression of the spring; it depends on the position of the cups with respect to each other and will preferably be chosen to be an integer.

BRIEF DESCRIPTION OF THE DRAWINGS

Other characteristics and advantages of the invention will become evident in the following description and annexed drawings.

DESCRIPTION OF A PREFERRED EMBODIMENT

Figure 1:
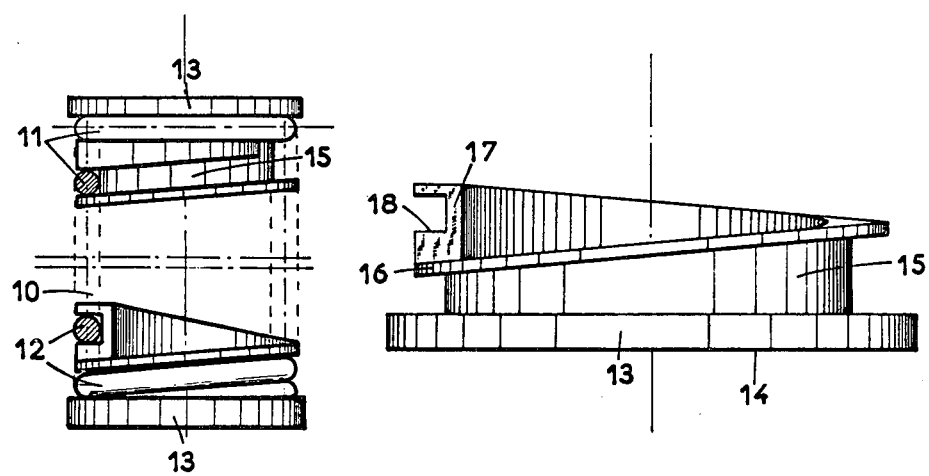
FIG. 1 depicts the assembly of a spring screwed onto a cup in a known manner.

According to a common manner of attaching a helical spring, shown in FIG. 1, the last loops 11 and 12 of each end of the spring 10 are screwed onto cups 13 provided for the purpose, which may be machined in a hollow cylinder, for example. Such cups contain a base 14 which constitutes the support surface of the spring, said surface being a plane perpendicular to the axis of said spring. Starting from said base, a helical groove 15 is cut in the cylindrical portion 16 of the cup to fit the spring 10. The groove of each cup ends at a flat face 17 lying on a plane passing approximately through the axis of the cup; the intersection of the groove with the plane forms, among others, an edge 18 which corresponds to the start of the useful loops.

If the loops 11 and 12 are not immobilized within the groove 15 by, say, gluing, it is evident that the loop will work within the groove when subjected to stress, over a range of approximately 120° from the edge 18 of the cup, thus determining the number of useful loops. This is explained by the fact that, under the effect of pressure, the spring becomes compressed and the diameter of the loops increases slightly. Because of these small displacements of the spring inside the groove, the initial point of the useful loops is not precisely determined and, consequently, the linearity characteristic of such a spring is not satisfactory.

In order to lessen this drawback, it may be proposed to glue the loops of the spring inside the cup groove. This will result in significant torsional stresses where the loop fits within the groove. Such stresses give rise to a very significant level of hysteresis.

The purpose of this invention is to find a satisfactory compromise, from the points of view of both linearity and hysteresis, between these two modes of attachment.

Figure 2:
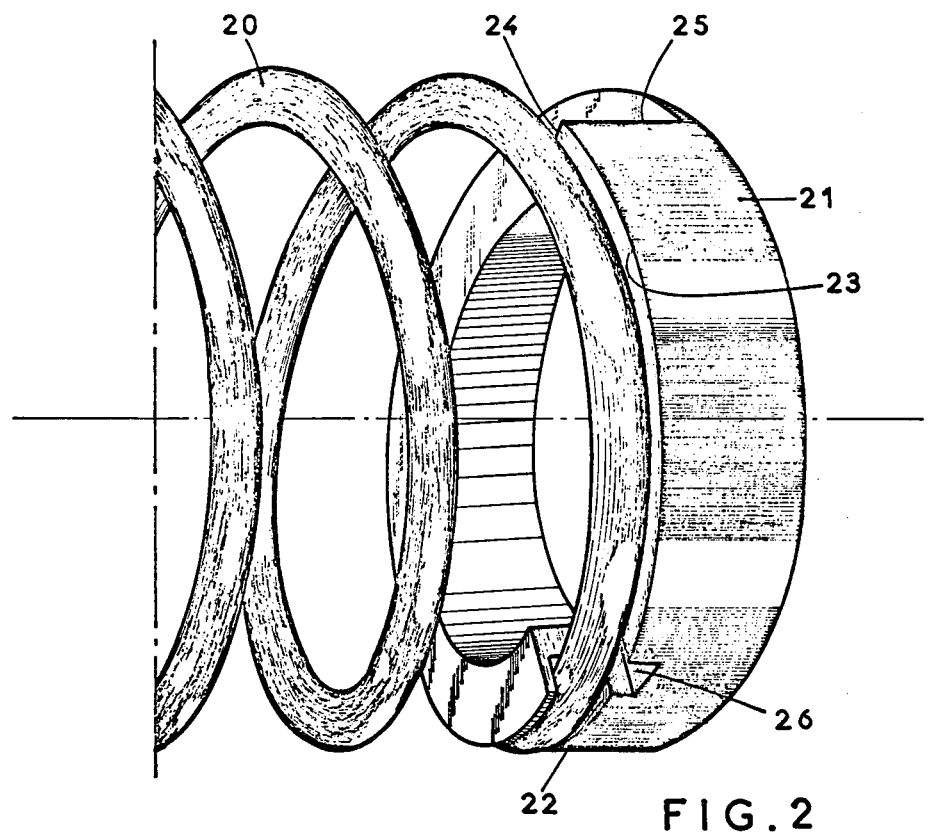
FIG. 2 depicts the assembly of a spring screwed onto a cup containing, in accordance with the invention, a helical slope whose end serves to support the spring.

According to a preferred arrangement of the invention, depicted in FIG. 2, each end of the spring 20 is mounted on cups 21 machined in a hollow cylinder, which constitutes parallel plane support surfaces. These cups contain a helical groove 22 which is extended by means of a helical slope 23; in accordance with the invention, the helical slope is generated by a rectilinear generatrix perpendicular to the axis of the helix and a portion of the wall of the groove 22 has the same generatrix. The slope 23 extends over a sector of approximately 120° from the end of the groove 22 to the edge 24 formed by the slope and the flat surface 25 lying in a vertical plane passing approximately through the axis of the cup. It is this edge 24 which defines the beginning of the useful loops.

The loops which fit within the groove 22 are prevented from moving by gluing, while the portion of loop that is supported on the helical slope 23 is not.

The pitch of the helical groove 22 and of the slope 23 is preferably greater than the pitch of the spring 20, in order to achieve a satisfactory contact between the free loop portion and the end of the ramp on the edge 24. In fact, a helical groove pitch smaller than the spring pitch (even if only very slightly so, due to manufacturing tolerances) leads to the result that the free loop portion will not be in perfect contact with the helical slope or, even more clearly, with its end. This means that the number of useful loops changes during compression of the spring, as the free loop portion gradually becomes supported on the slope 23, and one is again confronted with the original problem of non-linearity. Nevertheless, the pitch of the groove should not be too much larger than the pitch of the spring, since that would cause the middle section of the free loop portion to become displaced from ramp 24, possibly contributing to creating a lack of parallelism between the two cups glued to the spring. To prevent imprecisions in gluing, particularly those caused by the rising up of the glue due to capillary action during the polymerization, a notch 26 transverse to the slope is provided in said slope at its junction with the groove, ensuring an exact endpoint to the gluing.

It has been noted that, in a spring according to the invention, equipped with two cups such as those depicted in FIG. 2, the number of useful loops has a very significant effect on linearity but not on hysteresis. It has been observed, in fact, that the linearity is satisfactory when the number of useful loops is an integer, that is, when the cups at the two ends of the spring are offset 360° with respect to each other. Otherwise, the linearity characteristic deteriorates as the cups are angularly shifted with respect to each other; it reaches its worst point when the cups are opposed, that is, offset 180° with respect to each other.

Moreover, it has been observed that the positioning of each cup makes it possible to adjust the stiffness of the spring to the desired value by adjusting the number of useful loops. Consequently, and in order to take the preceding remark into account, the stiffness regulation is restricted to a narrow range corresponding to an offset of approximately 45° between the cups when linearity is very significant in the field of application of the spring. If, on the other hand, linearity is less important, the stiffness of the spring can be adjusted over a wider range, corresponding to a greater offset of the cups with respect to the optimal position, defined as an offset of 360°.

Figure 3:
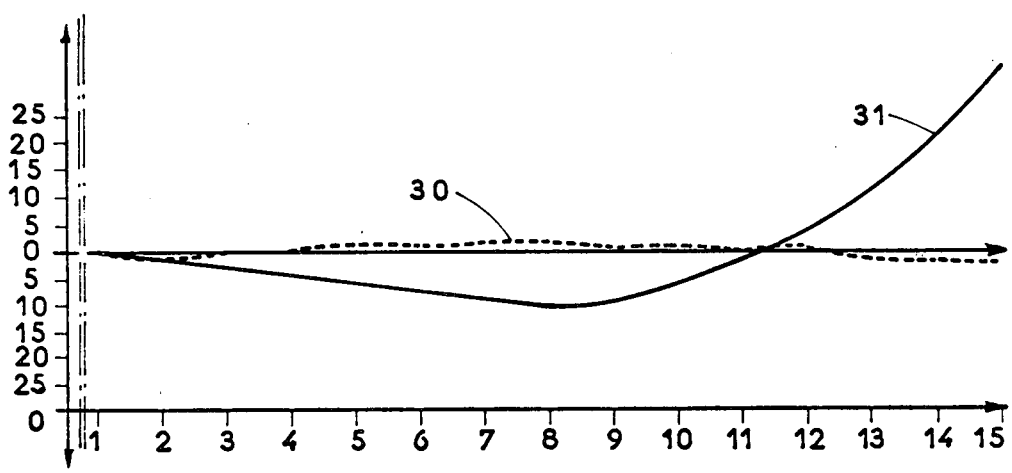
FIG. 3 depicts the linearity curve obtained by an assembly of the type shown in FIG. 2.

FIG. 3 shows a linearity curve 30 obtained with a spring mounted on cups of the type shown on FIG. 2, compared with the linearity curve 31 of a traditional spring. The variation in the stress transmitted by the spring, that is, the difference between the theoretical stress and the real, obtained stress, is shown on the ordinate as a function of the compression of the spring. The stress is indicated in grams and the compression in millimeters. Curve 30, resulting from an achievement according to the invention, is substantially coincident with the axis of abscissas, while curve 31 shows significant deviations.

The devices according to the invention find their application in regulation systems, especially where great precision is required and particularly in regulatory systems for turbine machines, where the linearity and hysteresis characteristics are of primary importance and constitute a major problem.

We claim:

1. Device for linearly converting a rectilinear displacement into a force and vice-versa, comprising: a helical compression spring having at each end a means holding the end loops thereof stationary relative to each other, consisting of a helical groove machined in a cup which constitutes the support surface of the spring, characterized by the fact that a helical ramp, whose generatrix is rectilinear and perpendicular to the axis of the helix, extends from one end of the groove as an extension of one side thereof, a notch transverse to the ramp is provided in said ramp at its junction with the groove, and said spring has loops which fit within the helical groove and are adhesively adhered therein up to said notch while a portion of loop engages the helical ramp free of adherence thereto, said notch serving to prevent the adhesive from flowing from said groove to said ramp.

2. Device according to claim 1, characterized by the fact that the portion of non-adhered loops located on the helical ramp extends over a sector of approximately 120°.

3. Device according to claim 1, characterized by the fact that the number of useful loops is a whole number.

* * * * *